United States Patent
Daniels et al.

(10) Patent No.: US 8,160,924 B2
(45) Date of Patent: Apr. 17, 2012

(54) PAY-PER-CLICK FRAUD PROTECTION

(75) Inventors: Fonda J. Daniels, Cary, NC (US); Pooja Kohli, Raleigh, NC (US); Paul F. McMahan, Apex, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1836 days.

(21) Appl. No.: 11/244,467

(22) Filed: Oct. 6, 2005

(65) Prior Publication Data

US 2007/0083519 A1 Apr. 12, 2007

(51) Int. Cl.
*G06F 17/60* (2006.01)
(52) U.S. Cl. .................................. 705/14.47
(58) Field of Classification Search .............. 705/14, 705/14.47
See application file for complete search history.

(56) References Cited

U.S. PATENT DOCUMENTS

| | | | |
|---|---|---|---|
| 5,870,546 A | 2/1999 | Kirsch | |
| 6,363,488 B1* | 3/2002 | Ginter et al. | 726/1 |
| 6,904,435 B2 | 6/2005 | Jenkins et al. | |
| 7,020,622 B1* | 3/2006 | Messer | 705/26 |
| 7,076,479 B1* | 7/2006 | Cheung et al. | 707/3 |
| 7,242,421 B2* | 7/2007 | Center et al. | 348/14.1 |
| 7,401,130 B2* | 7/2008 | Mason | 709/219 |
| 2002/0184256 A1 | 12/2002 | Reich et al. | |
| 2003/0040960 A1 | 2/2003 | Eckmann | |
| 2004/0153365 A1 | 8/2004 | Schneider et al. | |
| 2005/0080685 A1 | 4/2005 | Blum | |
| 2006/0122883 A1 | 6/2006 | Lynn | |
| 2006/0136294 A1* | 6/2006 | Linden et al. | 705/14 |

FOREIGN PATENT DOCUMENTS

| | | |
|---|---|---|
| WO | 0180846 A2 | 11/2001 |
| WO | 02091225 A2 | 11/2002 |
| WO | 02191225 A3 | 11/2002 |

* cited by examiner

*Primary Examiner* — Raquel Alvarez
*Assistant Examiner* — Michael Goldman
(74) *Attorney, Agent, or Firm* — Steven M. Greenberg, Esq.; Carey, Rodriguez, Greenberg & O'Keefe, LLP

(57) ABSTRACT

Embodiments of the invention provide a fraud prevention method for a pay-per-click data processing system. The method can include receiving a click through for a link in a host site which references a marketed site. The method also can include identifying a link address for the link in the click through. The method yet further can include comparing the identified link address to a modified link address recorded for an actual link address for the marketed site. Finally, the method can include quashing the click through if the identified link address is not the modified link address. Conversely, the method can include redirecting the click through to the marketed site if the identified link address is the modified link address.

8 Claims, 2 Drawing Sheets

PAY-PER-CLICK FRAUD PROTECTION

BACKGROUND OF THE INVENTION

1. Field of the Invention

The present invention relates to the field of e-marketing and more particularly to the field of pay-per-click marketing.

2. Description of the Related Art

The Internet has revolutionized the manner in which goods and services are marketed both locally and globally. The mere collection of a few electronic documents can represent a complex storefront when presented to the global computing community over the World Wide Web as a Web site. Interestingly, unlike the conventional sale of goods and services through a brick-and-mortar operation, the pages of a Web site can serve the purpose both of advertising and marketing medium and storefront. To wit, the content of a Web page can serve as a way to advertise goods and services, while also offering those same goods and services for sale responsive to a few mouse clicks.

Given the unique role of the Internet in the sale and marketing of goods and services, fundamental changes in traditional advertising and marketing have become apparent. In particular, e-marketing, unlike traditional marketing, involves a grass roots component. Search engines have facilitated the development of this grass roots component in which consumers discover the presence of a Web site through the postings of third parties. In the search engine paradigm, references to Web sites are cataloged and presented to consumers on demand in response to keyword searches.

The sheer volume of content indexed by the typical search engine can result in the individual Web sites becoming lost in the mix. Similar to a phone book entry among a sea of phone book entries, for many Web sites, the indexing of the Web site by the search engine can be as ineffective as not being indexed at all unless the Web site appears in the first few entries of a results list produced by the search engine. Accordingly, many Web sites rely on more advanced, fee-based, Internet based grass roots marketing techniques to advance the awareness of a Web site.

Specifically, whereas the grass roots nature of search engine linkage to a Web site involves no obligation on the part of the Web site owner/operator, other grass roots e-marketing techniques require the Web site operator to pay a fee. The presence of a fee necessarily reduces the number of marketed Web sites resulting in a higher level of visibility for a Web site. Once such fee-based, Internet grass roots marketing technique is pay-per-click marketing. In pay-per-click marketing, text or an image can be embedded in one Web site, however, when selected, the text or image can link to a second Web site. The first Web site is the host Web site and the second Web site is the marketed Web site.

In the pay-per-click model, whenever a viewer selects the text or image linking to the marketed Web site, the host Web site is compensated for the "click through". In this way, the marketed Web site need only pay the host Web site for a successful attempt at grass roots marketing. Notwithstanding, the pay-per-click model presupposes that each click through is legitimate in nature. However, it is well-known that fraud has become prevalent throughout the pay-per-click world. Specifically, it is not uncommon for a host Web site to automate the periodic selection of a pay-per-click link in order to enhance revenues (fraudulently) to the host Web site. Likewise, it is also not uncommon for a competitor to the operator of the marketed Web site to automate the selection of a pay-per-click link in order to unnecessarily increase the marketing costs for the pay-per-click for the operator of the marketed Web site.

BRIEF SUMMARY OF THE INVENTION

Embodiments of the present invention address deficiencies of the art in respect to pay-per-click processing and provide a novel and non-obvious method, system and computer program product for pay-per-click fraud prevention. In one embodiment, a pay-per-click data processing system can include a pay-per-click engine configured for coupling to a host site and a marketed site. The system of the embodiment also can include link randomization logic coupled to the pay-per-click engine. The logic can include program code enabled to modify a link address for a link disposed in the host site and referencing the marketed site. The pay-per-click engine, in turn, can include program code enabled to reject click throughs for the link which do not reference the modified link address.

The host site and marketed site can include a host Web site and a marketed Web site. Also, the link address can be a uniform resource locator (URL). The system of the embodiment further can include a clock coupled to the link randomizer. Consequently, the program code of the link randomization logic can be further enabled to modify the link address responsive to a time indicated by the clock. In one aspect of the embodiment, the program code of the link randomization logic can be further enabled to modify the link address to include a random value responsive to a time indicated by the clock.

Optionally, the system can include a clock coupled to the link randomizer. The program code of the link randomization logic further can be enabled to modify the link address in response to a time indicated by the clock. The modification can include a random value provided by the marketed site, a random number seed provided by the marketed site, and random number algorithm provided by the marketed site. As another option, the system additionally can include a counter enabled to count each click through of the link from a single source. As a result, the pay-per-click engine further can include program code enabled to challenge the single source of the click through to establish a human presence responsive to the counter crossing a threshold value.

In another embodiment, a fraud prevention method for a pay-per-click data processing system can be provided. The method can include receiving a click through for a link in a host site which references a marketed site. The method also can include identifying a link address for the link in the click through. The method yet further can include comparing the identified link address to a modified link address recorded for an actual link address for the marketed site. Finally, the method can include quashing the click through if the identified link address is not the modified link address. Conversely, the method can include redirecting the click through to the marketed site if the identified link address is the modified link address.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for pay-per-click fraud protection. In accordance with an embodiment of the present invention, a link associated with a link address referencing a marketed site can be disposed in a page of a host site. The associated link address can resolve directly to the marketed site. The link address of the disposed link, however, can be periodically altered, for example in a randomized fashion, to produce a temporary, modified link address which does not directly resolve to the marketed site. Optionally, the marketed site can supply one or more elements necessary to produce the temporary, modified link, for instance a random number, a seed for a random number generator, or a formula for producing a random number necessary to generate a randomized form of disposed link.

In this regard, intermediate pay-per-click logic can process the selection of the link to translate the temporary, modified link address into the associated link address which resolves directly to the marketed site. The intermediate pay-per-click logic further can quash attempts to fraudulently submit a simulated selection of the link using a link address which differs from the temporary, modified link address. Finally, a table correlating the temporary, modified link address to the associated link address can be maintained to facilitate the operation of the intermediate pay-per-click logic for legitimate attempts to submit a selection of the link. Also, as an optional, additional measure, a counter can be implemented to count a number of times a link is selected from the same site. When the counter exceeds a threshold value, the linking party can be challenged to validate the absence of a bot, such as recognizing text embedded in an image.

Figure 1:
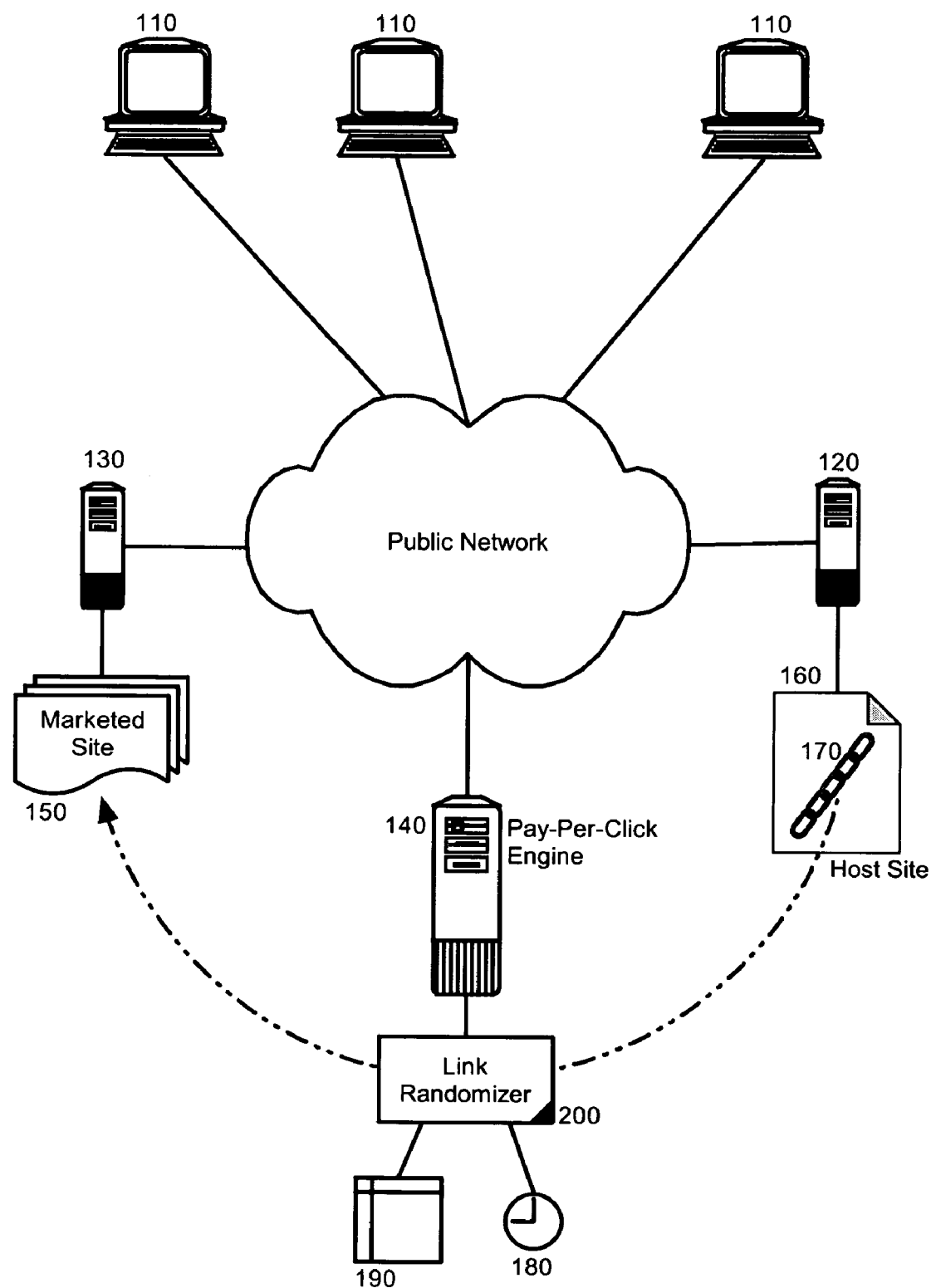
FIG. 1 is a schematic illustration of a pay-per-click data processing system configured with pay-per-click fraud protection.

In more particular illustration, FIG. 1 is a schematic illustration of a pay-per-click data processing system configured with pay-per-click fraud protection. The system can include a pay-per-click engine 140 in communication with a marketed site 150 accessible at a first content server 130. The pay-per-click engine 140 can be disposed in or communicatively coupled to a host site 160 accessible at a second content server 120. Notably, the host site 160 can include a link 170 associated with a link address of the marketed site 150 such that the link address can resolve to the marketed site 150 in the first content server 130.

Link randomization logic 200 coupled to the pay-per-click engine 140 can include program code enabled to change the link address of the link 170 to a modified address which does not directly resolve to the marketed site 150 in the first content server 130. The program code of the link randomization logic 200 can change the link address of the link 170 from time to time according to a coupled clock 180. For example, when a threshold period of time has elapsed as indicated by the clock 180, the program code of the link randomization logic 200 can be enabled to produce a random modification to the link address of the link 170. The correlation between the produced random modification and the link address of the link 170 can be maintained in a translation table 190.

Optionally, the random modification can be produced based upon a randomization algorithm provided by the marketed site 150. Alternatively, the random modification can be produced based upon a random number or numbers provided by the marketed site 150. As yet another alternative, the random modification can be produced based upon a seed provided by the marketed site 150 for use in a random number generator. The marketed site 150 can be prompted when it is necessary to produce the random modification to the link address of the link 170, or the marketed site 150 can provide the elements necessary for randomization pro-actively.

In operation, responsive to the receipt of a submission of the link 170, the program code of the link randomization logic 200 can receive a link address associated with the link 170. The program code of the link randomization logic 200 can be enabled to access a translation table 190 to determine whether a translation is available for the link address to resolve directly to the marketed site 150. If not, the program code of the link randomization logic 200 can consider the submission to fraudulent and the submission can be quashed. Otherwise, the program code of the link randomization logic 200, deeming the submission to be legitimate, can translate the link address and can redirect the submission to the marketed site 150 in the first content server 130. Additionally, the pay-per-click engine 140 can record the click-through for the legitimate submission.

Optionally, a counter can be established for the link 170. Each time the link 170 is selected from a particular site, the counter can be incremented. When the counter crosses a threshold value, the submission can be considered fraudulent and a prompt can be issued for the linking party challenging the linking party to provide a human response to a computer generated stimuli in order to prove the presence of a human. Examples, include well-known techniques such as recognizing text disposed within an image or responding to a logic question.

Figure 2:
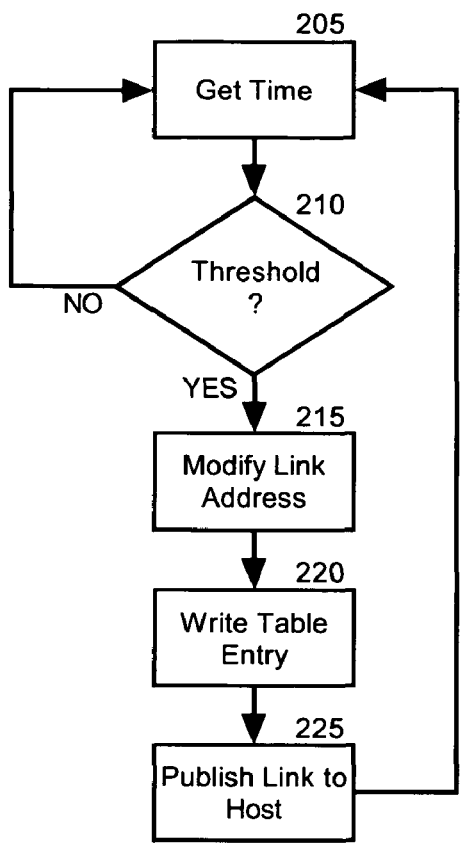
FIG. 2 is a flow chart illustrating a process for randomly assigning a link address for a pay-per-click link in the system of FIG. 1; and, FIG. 3 is a flow chart illustrating a pay-per-click fraud protection method.

In further illustration, FIG. 2 is a flow chart illustrating a process for randomly assigning a link address for a pay-per-click link in the system of FIG. 1. Beginning in block 205, a time can be retrieved and in block 210 it can be determined whether a threshold amount of time has elapsed to trigger a modification to a link address for a link to a marketed site. It is to be recognized by the skilled artisan, however, that the invention is not limited to the lapsing of time and other time based determinations are within the scope of the invention. Such other time based determinations can include the occurrence of a particular time.

In block 215, once the time threshold is encountered, the link address for a link disposed in a host site can be modified. The modification can include, for example, a modified portion of the uniform resource locator (URL) associated with the link. For instance, where the actual link URL referenced within the link is "www.marketedsite.com/pay-per-click-engine", the modified URL can be randomly assigned as a function of the actual link URL to "www.marketedsite1.com/pay-per-click-engine". In block 220, a translation can be recorded for the actual link URL and the modified URL. Finally, in block 225 the link with the modified URL can be published to the host site.

Figure 3:
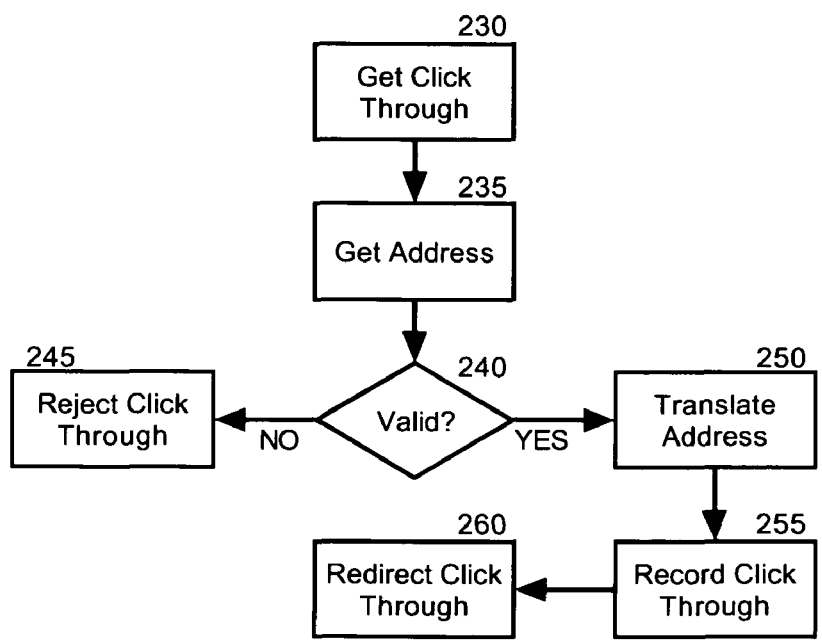

Once a link in the host site has been published, the pay-per-click engine referenced by the link address of the link can be process link submissions, whether fraudulent or legitimate. In illustration, referring to FIG. 3, in block 230 a click through can be received from the host site in association with a link disposed in the host site. In block 235, the link address for the link can be retrieved for processing. In decision block 240, it can be determined whether a recorded translation for the link address exists and whether the link address is legitimate. If not, in block 245 the click through can be rejected as illegitimate.

In decision block 240, if it is determined that the click through is legitimate, in block 250 the link address for the click through submission can be translated to an address which resolves to a corresponding marketed site. In block 255, the click through can be recorded to account for a pay-per-click. Finally, in block 260 the click through can be redirected to the corresponding marketed site according to the translated address provided in block 250.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a pay-per-click data processing system, a fraud prevention method comprising:
   receiving a click through for a link in a host site which references a marketed site;
   identifying a link address for said link in said click through;
   comparing said identified link address to a modified link address recorded for an actual link address for said marketed site; and,
   quashing said click through if said identified link address is not said modified link address.

2. The method of claim 1, further comprising redirecting said click through to said marketed site if said identified link address is said modified link address.

3. The method of claim 2, further comprising recording said click through in a pay-per-click engine.

4. The method of claim 1, further comprising repeatedly modifying said modified link address recorded for said actual link address.

5. A computer program product comprising a computer usable medium having computer usable program code for pay-per-click fraud prevention, said computer program product including:
   computer usable program code for receiving a click through for a link in a host site which references a marketed site;
   computer usable program code for identifying a link address for said link in said click through;
   computer usable program code for comparing said identified link address to a modified link address recorded for an actual link address for said marketed site; and,
   computer usable program code for quashing said click through if said identified link address is not said modified link address.

6. The computer program product of claim 5, further comprising computer usable program code for redirecting said click through to said marketed site if said identified link address is said modified link address.

7. The computer program product of claim 6, further comprising computer usable program code for recording said click through in a pay-per-click engine.

8. The computer program product of claim 5, further comprising computer usable program code for repeatedly modifying said modified link address recorded for said actual link address.

* * * * *